United States Patent
Singa Ramalingam et al.

(10) Patent No.: US 12,278,931 B2
(45) Date of Patent: Apr. 15, 2025

(54) SYSTEMS AND METHODS FOR ADAPTIVE COMPUTER-ASSISTANCE PROMPTS

(71) Applicant: Verizon Patent and Licensing Inc., Basking Ridge, NJ (US)

(72) Inventors: RajeshKhanna Singa Ramalingam, Dayton, NJ (US); Amol Chakradeo, Martinsville, NJ (US); Srinivasa Kaniganti, Frisco, TX (US); Sankar Shanmugam, Dayton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 190 days.

(21) Appl. No.: 18/151,090

(22) Filed: Jan. 6, 2023

(65) Prior Publication Data

US 2024/0236237 A1    Jul. 11, 2024

(51) Int. Cl.
*H04M 3/00*       (2024.01)
*H04L 12/66*      (2006.01)
*H04L 51/04*      (2022.01)
*H04M 3/436*      (2006.01)
*H04M 3/523*      (2006.01)
*H04M 5/00*       (2006.01)

(52) U.S. Cl.
CPC .......... *H04M 3/5233* (2013.01); *H04L 51/04* (2013.01); *H04M 3/4365* (2013.01)

(58) Field of Classification Search
CPC ............. H04M 3/4936; H04M 3/5175; H04M 3/5166; H04M 3/5191; H04M 3/5183; H04M 2201/40; H04M 3/4933; H04M 3/4931; H04M 3/5235; H04M 3/5237; H04M 15/56; H04M 15/57; G10L 15/22; G10L 15/1822; G10L 15/26; G10L 15/1815; G10L 15/16; G10L 25/63; G10L 17/06; G06N 20/00; G06N 5/022; G06F 40/30; G06F 16/3344; G06F 16/334; G06F 16/73; G06F 40/35; G06F 40/40; G06F 3/0482; G06F 40/20
USPC ............ 379/265.02, 265.01, 265.13, 265.11; 370/352
See application file for complete search history.

(56) References Cited

U.S. PATENT DOCUMENTS 10,484,542 B1 * 11/2019 Rager .................. G06F 40/279
11,315,179 B1 *  4/2022 Rehder .............. G06F 18/2113
(Continued)

*Primary Examiner* — Kharye Pope

(57) ABSTRACT

In some implementations, an agent-assistance platform may receive a first call stream. The agent-assistance platform may identify a first topic of the first call stream. The agent-assistance platform may output, using a recommendation model, one or more recommendations associated with the first topic of the first call stream. The agent-assistance platform may determine whether a recommendation, of the one or more recommendations, is selected for inclusion in the first call stream. The agent-assistance platform may update the recommendation model with information indicating whether the recommendation is selected for inclusion in the first call stream. The agent-assistance platform may receive a second call stream. The agent-assistance platform may identify a second topic of the second call stream, the first topic being the same as the second topic. The agent-assistance platform may selectively output, using the updated recommendation model, the recommendation for the second call stream.

20 Claims, 10 Drawing Sheets

(56) References Cited

U.S. PATENT DOCUMENTS

| | | | |
|---|---|---|---|
| 11,605,021 B1* | 3/2023 | Khare | G06N 5/046 |
| 2008/0152121 A1* | 6/2008 | Mandalia | H04M 3/51 |
| | | | 379/265.01 |
| 2009/0097634 A1* | 4/2009 | Nambiar | H04M 3/5183 |
| | | | 379/265.09 |
| 2010/0169245 A1* | 7/2010 | Basel | G06N 20/00 |
| | | | 706/12 |
| 2012/0303356 A1* | 11/2012 | Boyle | G06F 16/3338 |
| | | | 707/765 |
| 2014/0119531 A1* | 5/2014 | Tuchman | H04M 7/003 |
| | | | 379/265.09 |
| 2014/0314225 A1* | 10/2014 | Riahi | H04M 3/5175 |
| | | | 379/265.09 |
| 2015/0201077 A1* | 7/2015 | Konig | G06Q 30/0281 |
| | | | 379/265.07 |
| 2021/0134283 A1* | 5/2021 | Adibi | H04M 3/5166 |
| 2023/0247140 A1* | 8/2023 | Li | H04M 3/5233 |
| | | | 379/266.01 |
| 2024/0241913 A1* | 7/2024 | Jaeger | G06Q 30/0276 |

* cited by examiner

| | | Occurrence-6 | Occurrence-7 | Occurrence-8 | Occurrence-9 | Occurrence-10 |
|---|---|---|---|---|---|---|
| Agent-1 | Topic-1 | DC | DC | DC | DC | DC |
| | Topic-2 | DC | DC | DC | DC | DC |
| | Topic-N | DD | DD | DD | DD | DD |

|  |  | Occurrence-6 | Occurrence-7 | Occurrence-8 | Occurrence-9 | Occurrence-10 |
|---|---|---|---|---|---|---|
| Agent-1 | Topic-1 | D-NC | DD | DD | DD | DD |
|  | Topic-2 | D-NC | D-NC | D-NC | D-NC | D-NC |
|  | Topic-N | DD | DD | DD | DD | DD |

FIG. 1F

SYSTEMS AND METHODS FOR ADAPTIVE COMPUTER-ASSISTANCE PROMPTS

BACKGROUND

A system may provide an interface to facilitate communication between two or more parties. For example, a chat interface may facilitate textual communication. A chat interface may be useful for communication between a user (e.g., a customer) and an agent, such as a chat bot, a customer service agent, a technical support technician, and/or the like. The system may provide the agent with recommendations to facilitate support of the user. For example, when a technical support technician is troubleshooting a connectivity issue, the system may guide the technical support technician on a set of steps that the technical support technician and the user can use for resolving the connectivity issue.

BRIEF DESCRIPTION OF THE DRAWINGS

FIGS. 1A-1F are diagrams of an example associated with adaptive computer-assistance prompts.

DETAILED DESCRIPTION OF EXAMPLE EMBODIMENTS

Figure 1A:
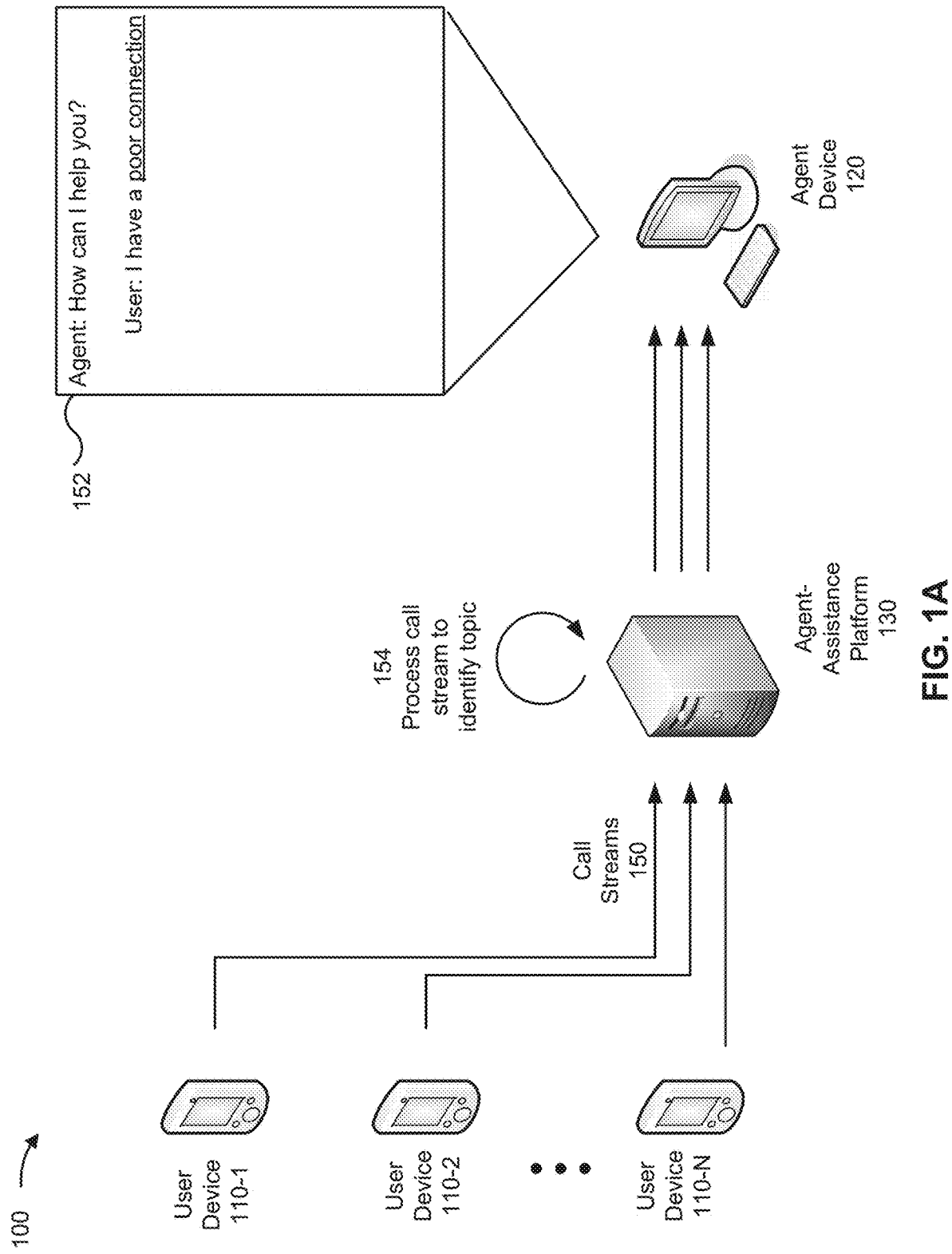

The following detailed description of example implementations refers to the accompanying drawings. The same reference numbers in different drawings may identify the same or similar elements.

A chat interface may be used to facilitate communication between participants. In some cases, the participants may include a user of a user device (or a potential user, such as a customer) and an agent. For example, a user may engage the agent in the interest of receiving a service (e.g., customer service, technical support, sales, etc.). A system may support the chat interface by providing a channel for textual communication, voice communication, or video communication, among other examples. The system may provide automated assistance for the agent. For example, when the agent is a technical support technician, the system may provide guidance on how to resolve a particular issue. In this case, the technical support technician may use an agent device to search an index of issues, identify an issue that a user is having, and request that guidance for resolving the issue be provided for display. Similarly, a sales representative may request and receive information identifying a group of offers for a customer, such as price information on different services.

However, searching for guidance may distract an agent from communication with the user, which may result in the agent missing important information that the user is providing. This may result in incorrect guidance being provided, which may lengthen customer support calls and/or result in an inability to correct issues with user devices. Accordingly, a system may monitor a communication and automatically provide recommendations. For example, the system may detect key words in the communication, such as "connectivity issue," "new Internet service," or "cancel service" and automatically identify and provide recommendations to the agent of difference types of guidance that may be applicable to the user. However, it has been observed that such recommendations occur with a high frequency and sometimes include erroneous recommendations (e.g., that are not relevant to the user and the agent), and that the recommendations sometimes become a distraction to the agent, rather than reducing distractions. Accordingly, some agents ignore all recommendations that are provided, even when the recommendations are applicable to an issue that the user is describing. This may result in excessively long communications, which may use network and/or system resources. Moreover, failing to use the recommendations may result in the agents failing to resolve issues that users are having, which results in poor user device performance. Furthermore, providing recommendations can be resource intensive, so it may be desirable to only provide a recommendation when an agent will use the recommendation.

Some implementations described herein provide an agent-assistance platform that can analyze a usage of previously provided recommendations to determine whether to provide subsequent recommendations. For example, the agent-assistance platform may suppress one or more recommendations (or forgo identifying the recommendations altogether) when the agent-assistance platform predicts that the one or more recommendations are seen as a distraction (rather than as assistance) by an agent.

In this way, the agent-assistance platform reduces a usage of system resources to provide recommendations by suppressing recommendations that will not be used. Additionally, or alternatively, the agent-assistance platform reduces distractions between a user and an agent, which can reduce a length of a communication, thereby reducing a usage of system and/or network resources. Additionally, or alternatively, by reducing a likelihood that agents view recommendations as distractions, the agent-assistance platform improves a measured clickthrough rate (e.g., by ensuring that recommendations that are provided are seen as useful), thereby increasing a likelihood that an agent can resolve a user's issue, which improves customer satisfaction and, in the case that the user's issue relates to a user device, user device performance.

FIGS. 1A-1F are diagrams of an example 100 associated with adaptive computer-assistance prompts. As shown in FIG. 1A, example 100 includes a set of user devices 110-1 through 110-N, an agent device 120, and an agent-assistance platform 130. In some implementations, the agent-assistance platform 130 may monitor a set of call streams 150.

As further shown in FIG. 1A, the agent device 120 may communicate with a user device 110. For example, the agent device 120 may enable a textual conversation 152 between a user of a user device 110 and an agent using the agent device 120. In this case, the agent-assistance platform 130 may monitor the textual conversation 152 to identify recommendations, as described below. Additionally, or alternatively, the agent device 120 may enable an audio conversation, video conversation, or virtual-reality conversation between the user of a user device 110 and an agent using the agent device 120. In this case, the agent-assistance platform 130 may use a voice-to-text functionality or other functionality to convert a conversation to a textual conversation for processing to identify recommendations, as described below.

As further shown in FIG. 1A, and by reference number 154, the agent-assistance platform 130 may process a call stream to identify a topic. For example, the agent-assistance platform 130 may apply a natural language processing technique to the textual conversation 152 to identify a topic of the textual conversation 152, such as identifying a "Connectivity Issue" topic based on a user indicating that the user has experienced a "poor connection." Additionally, or alternatively, the agent-assistance platform 130 may identify another type of topic, such as a sales topic, a billing topic, a battery life topic, a software topic, or a hardware topic, among other examples. In some implementations, the agent-assistance platform 130 may convert a call stream to a textual format to identify a topic. For example, the agent-assistance platform 130 may use a voice-to-text functionality to convert an audio conversation to a textual conversation to enable processing of the textual conversation using natural language processing. Additionally, or alternatively, the agent-assistance platform 130 may apply natural language processing directly to the audio conversation, such as by using an artificial intelligence or neural network audio processing functionality.

Figure 1B:
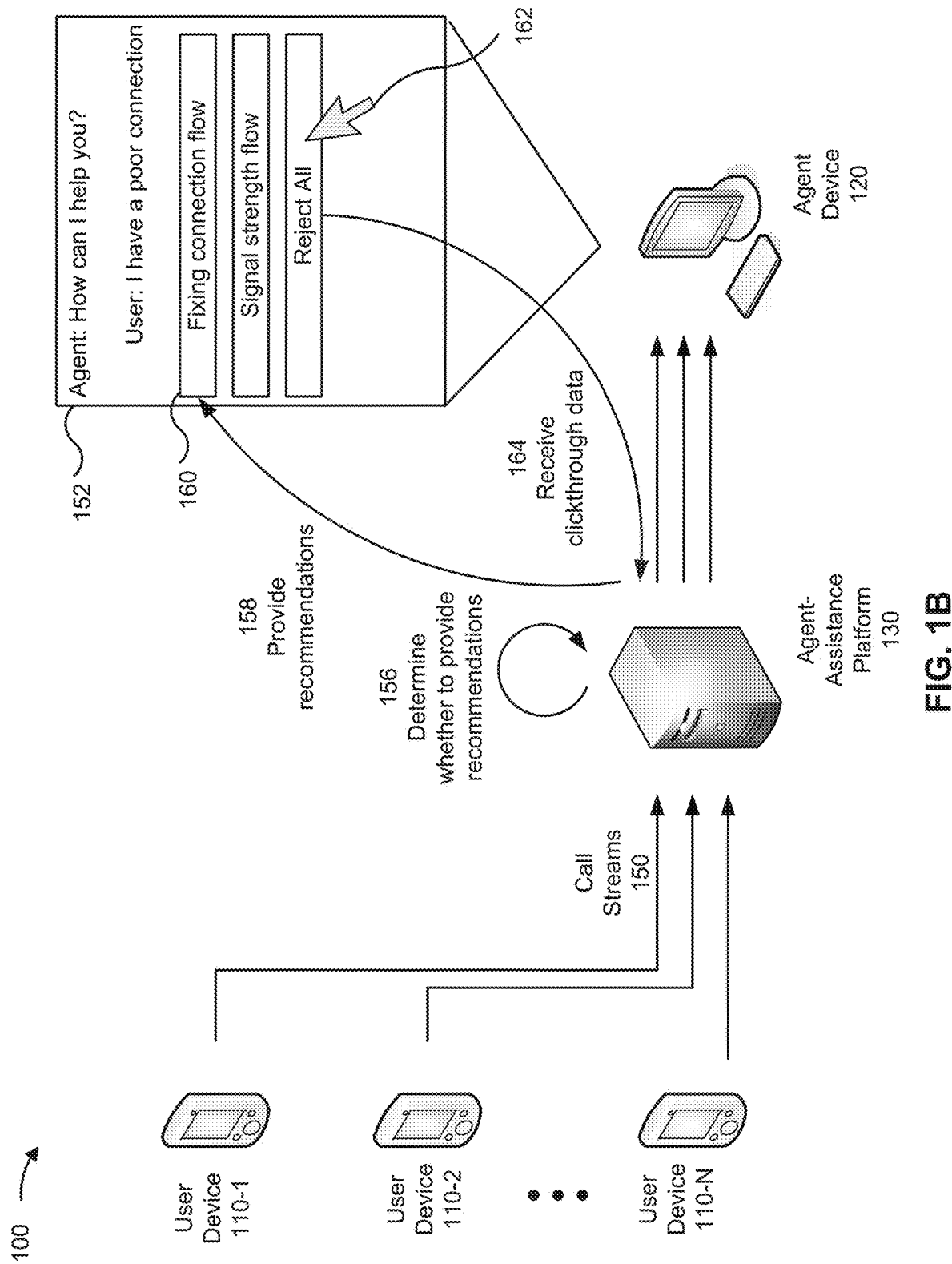

As shown in FIG. 1B, and by reference number 156, the agent-assistance platform 130 may determine whether to provide recommendations. For example, the agent-assistance platform 130 may determine whether to provide a recommendation based on a topic of the textual conversation 152. For example, when the agent-assistance platform 130 determines that the textual conversation 152 relates to a "Connectivity Issue" topic, the agent-assistance platform 130 may use a recommendation model to evaluate previous outcomes for providing recommendations for the "Connectivity Issue" topic (e.g., using an artificial intelligence or machine learning model to determine whether an agent using the agent device 120 selected previously provided recommendations or ignored previously provided recommendations). In this case, based on determining that a previously provided recommendation was selected by the agent, the agent-assistance platform 130 may provide one or more recommendations for the "Connectivity Issue" topic, as shown by reference number 158.

Figure 1C:
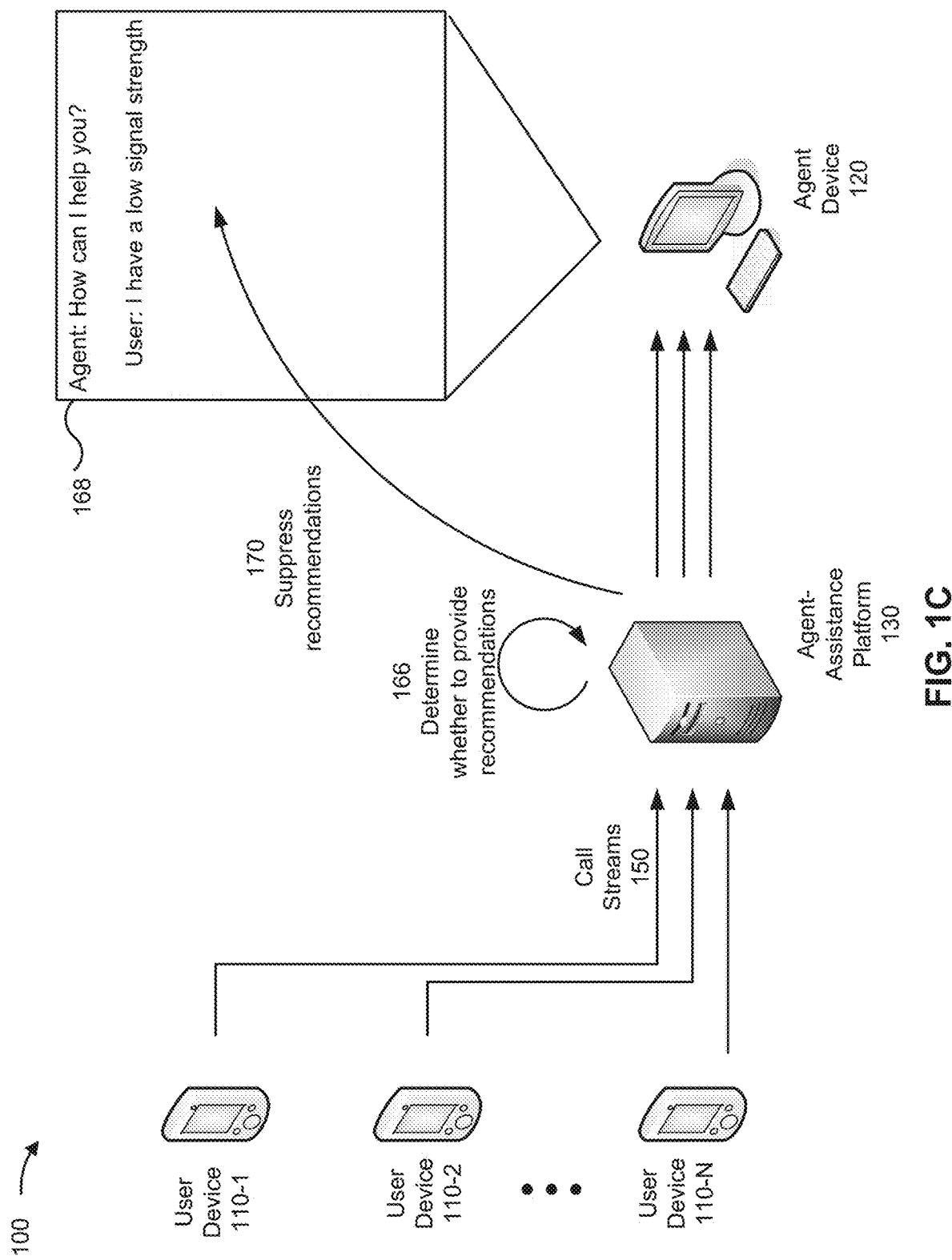
Figure 1D:

As an example, as shown in FIG. 1D, the agent-assistance platform 130 may store historical behavior data identifying whether a recommendation on a topic was displayed (D) and clicked (C) (DC) or displayed and not clicked (NC) (D-NC). For example, as shown by diagram 190, when a first topic (Topic-1) was identified, a recommendation for the first topic may have been displayed and clicked on a first occurrence and displayed and not clicked on a second through fifth occurrence. In contrast, for a second topic (Topic-2), a recommendation for the second topic may have been displayed and clicked for a first occurrence through a fifth occurrence. In this case, the agent-assistance platform 130 may apply the recommendation model to the historical behavior data to determine whether to display a recommendation for an identified topic.

The agent-assistance platform 130 may use statistical methods, machine learning, and/or artificial intelligence applied to the historical behavior data to predict a likelihood that an agent will click on a displayed recommendation, as described in more detail below. In this case, if the likelihood of the agent selecting a recommendation for inclusion in a conversation (e.g., a likelihood that the agent clicks on the recommendation to begin following instructions of the recommendation) satisfies a threshold, the agent-assistance platform 130 may provide the recommendation for display. In contrast, if the likelihood does not satisfy the threshold, the agent-assistance platform 130 may suppress the recommendation. For example, the agent-assistance platform 130 may not display the recommendation in the user interface, thereby avoiding distracting the agent with a recommendation that the agent is determined to be unlikely to select (even though the recommendation may be relevant).

In another example, rather than an artificial intelligence model, the agent-assistance platform 130 may use an algorithm to evaluate the historical behavior data. For example, the agent-assistance platform 130 may determine that a quantity of "DCs" in a previous 5 occurrences of a topic is greater than zero, and may determine to provide the recommendation for display. In contrast, in this example, if the quantity of "DCs" in a previous 5 occurrences of the topic is zero, then the agent-assistance platform 130 may suppress (e.g., forgo) providing the recommendation for a period of time. In this case, the agent-assistance platform 130 may log that the topic was identified but the recommendation was not displayed. For example, as shown in FIG. 1E, and by diagram 192, for a topic N, the agent-assistance platform 130 has logged that the agent-assistance platform 130 used an algorithm (or artificial intelligence model) to reach a "Don't Display" ("DD") determination for a sixth through tenth occurrence of a topic.

In some implementations, after a threshold period of time of not displaying a recommendation, the agent-assistance platform 130 may return to displaying a recommendation. For example, the agent-assistance platform 130 may use a period during which a recommendation was not provided (e.g., a quantity of conversations, a quantity of identified topics, an absolute amount of time) as a factor in evaluating the artificial intelligence recommendation model for predicting a likelihood that an agent will select a recommendation. In other words, the longer that a period of time is from a most recent instance of providing a recommendation on a particular topic, the more likely that the recommendation will be selected by an agent.

In some implementations, the agent-assistance platform 130 may select a recommendation model from a set of recommendation models. For example, agent-assistance platform 130 may have recommendation models specific to a particular agent, a particular user device type, a particular time of day, a particular topic, or a particular recommendation, among other examples. In this case, the agent-assistance platform 130 may determine that a first topic is identified and may select a recommendation model relating to analysis of clickthrough likelihood for the first topic. Additionally, or alternatively, the agent-assistance platform 130 may have multiple topics combined in a single recommendation model. In this case, the agent-assistance platform 130 may determine that a first topic is identified and select a recommendation model applicable to the first topic and one or more second topics.

In another example, rather than an artificial intelligence recommendation model, the agent-assistance platform 130 may use an algorithm to determine whether to return to providing a recommendation for a particular topic after determining not to display the recommendation. For example, if a last 5 occurrences (or some other static threshold or configured threshold) of a topic resulting in a determination to not display a recommendation for the topic (e.g., as shown in diagram 192 for topic N), the agent-assistance platform 130 may return to providing the recommendation in a next occurrence of a topic. In some implementations, as described above with regard to the recommendation models, the agent-assistance platform 130 may have multiple algorithms. For example, the agent-assistance platform 130 may have an algorithm specific to using historical clickthrough data for a particular call agent or a group of common call agents (e.g., a cluster as described below), among other examples.

In some implementations, the agent-assistance platform 130 may perform another action. For example, the agent-assistance platform 130 may alter a manner in which a recommendation is displayed based on a result of an artificial intelligence recommendation model or an algorithm. In this case, rather than or in addition to displaying or suppressing display of a recommendation, the agent-assistance platform 130 may adjust textual characteristics of the recommendation, for example, a font or size of the recommendation (e.g., to a less or more visible font or size), adjust a type of user interface element used to display the recommendation (e.g., a pop-up window, text within a chat box, an audio alert), or adjust a recommendation that is selected (e.g., when multiple recommendations are available for a topic and a best recommendation has been skipped by an agent a particular quantity of instances, the agent-assistance platform 130 may switch to providing a second best recommendation). In this way, the agent-assistance platform 130 can use clickthrough rate as a factor in determining an accuracy of recommendations and/or a best manner of providing recommendations.

Returning to FIG. 1B, and as shown by reference number 160, the agent-assistance platform 130 may cause the one or more recommendations to be displayed in a user interface of the agent device 120 (or a user device 110, in some implementations). For example, with regard to diagram 190 of FIG. 1D, when the agent-assistance platform 130 identifies topic 1 for a third occurrence, the agent-assistance platform 130 may determine to provide the recommendation for topic 1 for display. As shown by reference numbers 162 and 164, the agent using the agent device 120 may select (or not select, as shown) the one or more recommendations, and the agent-assistance platform 130 may receive clickthrough data (e.g., indicating whether the agent selected or did not select the one or more recommendations). Based on receiving the clickthrough data, the agent-assistance platform 130 may update a recommendation model (e.g., the recommendation model for the "Connectivity Issue" topic and/or for the particular agent using the agent device 120). Additionally, or alternatively, based on receiving the clickthrough data, the agent-assistance platform 130 may update the algorithm (e.g., by updating a table or other data structure, such as shown in diagram 190 or diagram 192). The above-mentioned algorithms may be a form or a part of a recommendation model, in some implementations. In other words, using a recommendation model, as described herein, may include evaluating an algorithm as described herein.

As shown in FIG. 1C, and by reference number 166, the agent-assistance platform 130 may determine whether to provide another one or more recommendations for another textual conversation 168 between the agent device 120 and a user device 110. For example, the agent-assistance platform 130 may identify another "Connectivity Issue" topic based on parsing the textual conversation 168 to identify a set of key words "low signal strength" that correlate with the "Connectivity Issue" topic. In this case, based on evaluating the recommendation model (e.g., for the "Connectivity Issue" topic and/or for the particular agent using the agent device 120), the agent-assistance platform 130 may determine to suppress providing recommendations, as shown by reference number 170, based on exceeding a threshold likelihood that a recommendation will be skipped, based on exceeding a threshold quantity of instances of skipping a recommendation, or another factor. For example, as shown in FIG. 1F, and by diagram 194, based on identifying topic 1 for an eighth occurrence, the agent-assistance platform 130 may determine not to display recommendations for topic 1 based on a history of the agent not clicking on the recommendations for topic 1. In this case, the agent-assistance platform 130 may forgo identifying and transmitting recommendations for the "Connectivity Issue" topic to the agent device 120 for a configured period of time (e.g., for up to 5 consecutive occurrences, in one example). In this case, after expiration of the configured period of time, the agent-assistance platform 130 may return to providing recommendations for the "Connectivity Issue" topic. In this way, the agent-assistance platform 130 selectively provides recommendations (e.g., in some scenarios recommendations are provided and in other scenarios recommendations are not provided).

Furthermore, the agent-assistance platform 130 uses artificial intelligence and/or algorithmic analysis of historical recommendation data to optimize clickthrough rates (e.g., ensure that recommendations, which are predicted to be ignored by agents, are suppressed and recommendations that are predicted to be selected by agents are provided). By optimizing (e.g., improving) clickthrough rate, the agent-assistance platform 130 reduces an average handle time of an interaction between an agent and a user, thereby conserving processing and network resources while improving both agent and user satisfaction.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
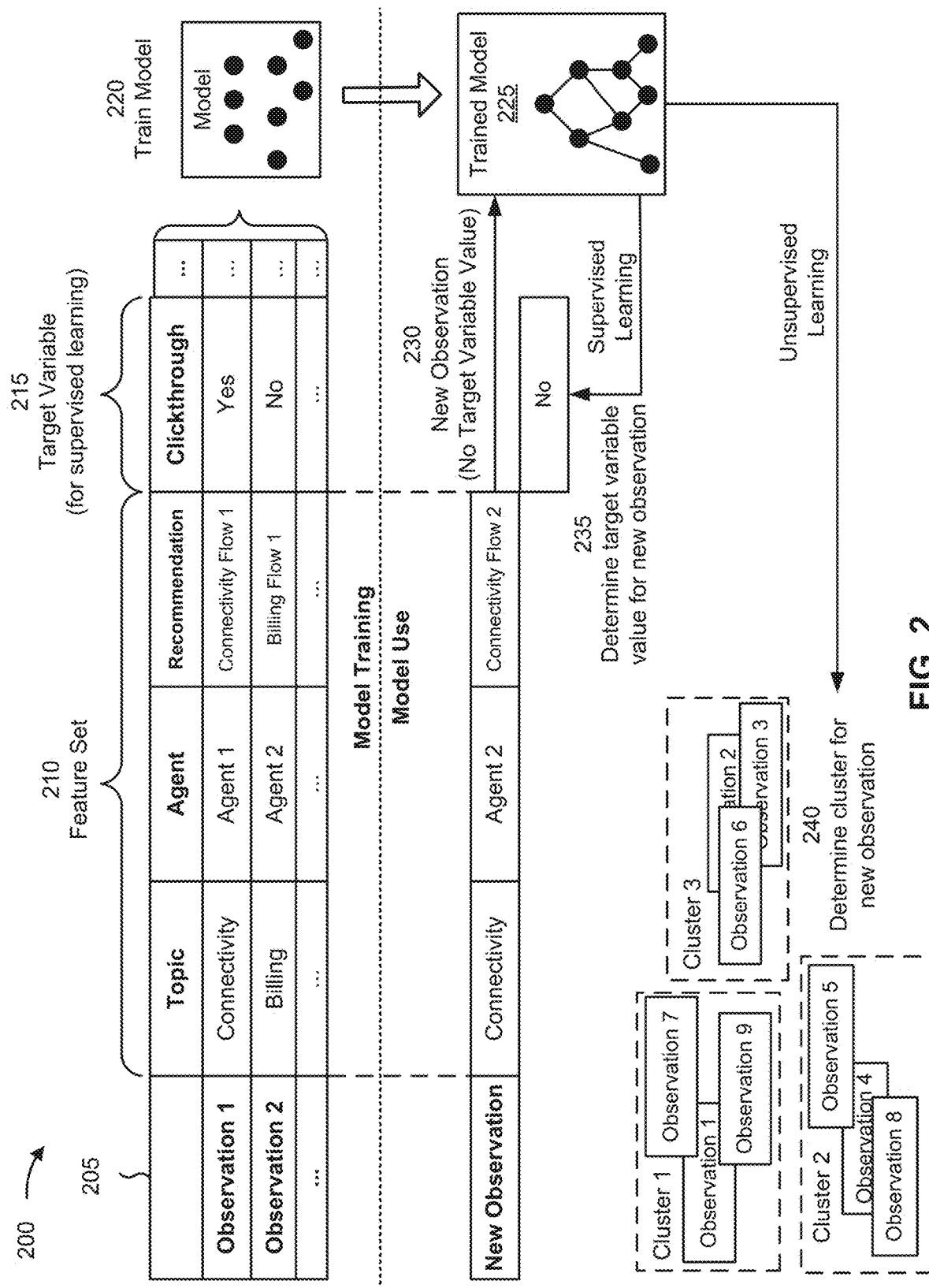
FIG. 2 is a diagram illustrating an example of training and using a machine learning model in connection with systems and methods for adaptive computer-assistance prompts.

FIG. 2 is a diagram illustrating an example 200 of training and using a machine learning model in connection with systems and methods for adaptive computer-assistance prompts. The machine learning model training and usage described herein may be performed using a machine learning system. The machine learning system may include or may be included in a computing device, a server, a cloud computing environment, or the like, such as the agent-assistance platform 130 or the agent-assistance platform 301, among other examples described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from an agent device as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from an agent device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a topic, a second feature of an agent, a third feature of a recommendation, and so on. As shown, for a first observation, the first feature may have a value of "Connectivity", the second feature may have a value of "Agent 1", the third feature may have a value of "Connectivity Flow 1", and so on. These features and feature values are provided as examples, and may differ in other examples. For example, the feature set may include one or more of the following features: time of day, historical clickthrough data, agent device type, user device type, or received agent feedback, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is clickthrough (e.g., whether an agent is predicted to click on a recommendation that is provided), which has a value of "Yes" for the first observation.

The feature set and target variable described above are provided as examples, and other examples may differ from what is described above. For example, other target variables may include a clickthrough likelihood or a suggested recommendation, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, the machine learning system may use a decision tree algorithm to determine whether to display a recommendation based on whether a previous one or more recommendations were selected by, for example, a particular agent. Additionally, or alternatively, the machine learning system may use the support vector machine algorithm to classify an agent into a group of agents for which historical data may be pooled. In other words, the clickthrough rate of a first agent, in an identified group or cluster, may affect whether a recommendation is transmitted for display to a second agent in the identified group or cluster. In this way, the machine learning system may improve predictions by enabling pooling of historical data to perform more accurate predictions than if each agent is evaluated separately. After training, the machine learning system may store the machine learning model as a trained machine learning model 225 to be used to analyze new observations.

As an example, the machine learning system may obtain training data for the set of observations based on stored log data from a set of conversations between a set of agents and users. The log data may be analyzed to determine occurrences of topics, recommendations that were displayed for the topics, and clickthrough results for the recommendations. In this case, other contextual data may be correlated with the log data, such as which agent was involved in each conversation, at what time the conversation occurred, or a classification of a difficulty of a problem (e.g., a more difficult problem may correlate to a higher clickthrough likelihood than an easier problem, which the agent may be able to resolve without using a recommendation), among other examples.

As shown by reference number 230, the machine learning system may apply the trained machine learning model 225 to a new observation, such as by receiving a new observation and inputting the new observation to the trained machine learning model 225. As shown, the new observation may include a first feature of a "Topic," a second feature of an "Agent," a third feature of a "Recommendation," and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "No" for the target variable of "Clickthrough" for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, suppressing display of a recommendation. The first automated action may include, for example, forgoing identifying the recommendation and/or transmitting information identifying the recommendation to the agent device for display for a new call stream with a common topic (e.g., the same topic from which the machine learning system generated a prediction).

As another example, if the machine learning system were to predict a value of "Yes" for the target variable of "Clickthrough," then the machine learning system may provide a second (e.g., different) recommendation (e.g., to identify and provide the recommendation) and/or may perform or cause performance of a second (e.g., different) automated action (e.g., identifying the recommendation and transmitting information identifying the recommendation).

In some implementations, the trained machine learning model 225 may classify (e.g., cluster) the new observation in a cluster, as shown by reference number 240. The observations within a cluster may have a threshold degree of similarity. As an example, if the machine learning system classifies a new observation in a first cluster (e.g., a first grouping of agents), then the machine learning system may provide a first recommendation, such as to pool historical data for agents in the first grouping of agents for use in determining whether to provide a recommendation.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include further clickthrough data.

In this way, the machine learning system may apply a rigorous and automated process to controlling recommendation systems used, for example, for user-support conversations. The machine learning system may enable recognition and/or identification of tens, hundreds, thousands, or millions of features and/or feature values for tens, hundreds, thousands, or millions of observations, thereby increasing accuracy and consistency and reducing delay associated with clickthrough predictions relative to requiring computing resources to be allocated for tens, hundreds, or thousands of operators to manually predict clickthrough using the features or feature values.

As indicated above, FIG. 2 is provided as an example. Other examples may differ from what is described in connection with FIG. 2.

Figure 3:
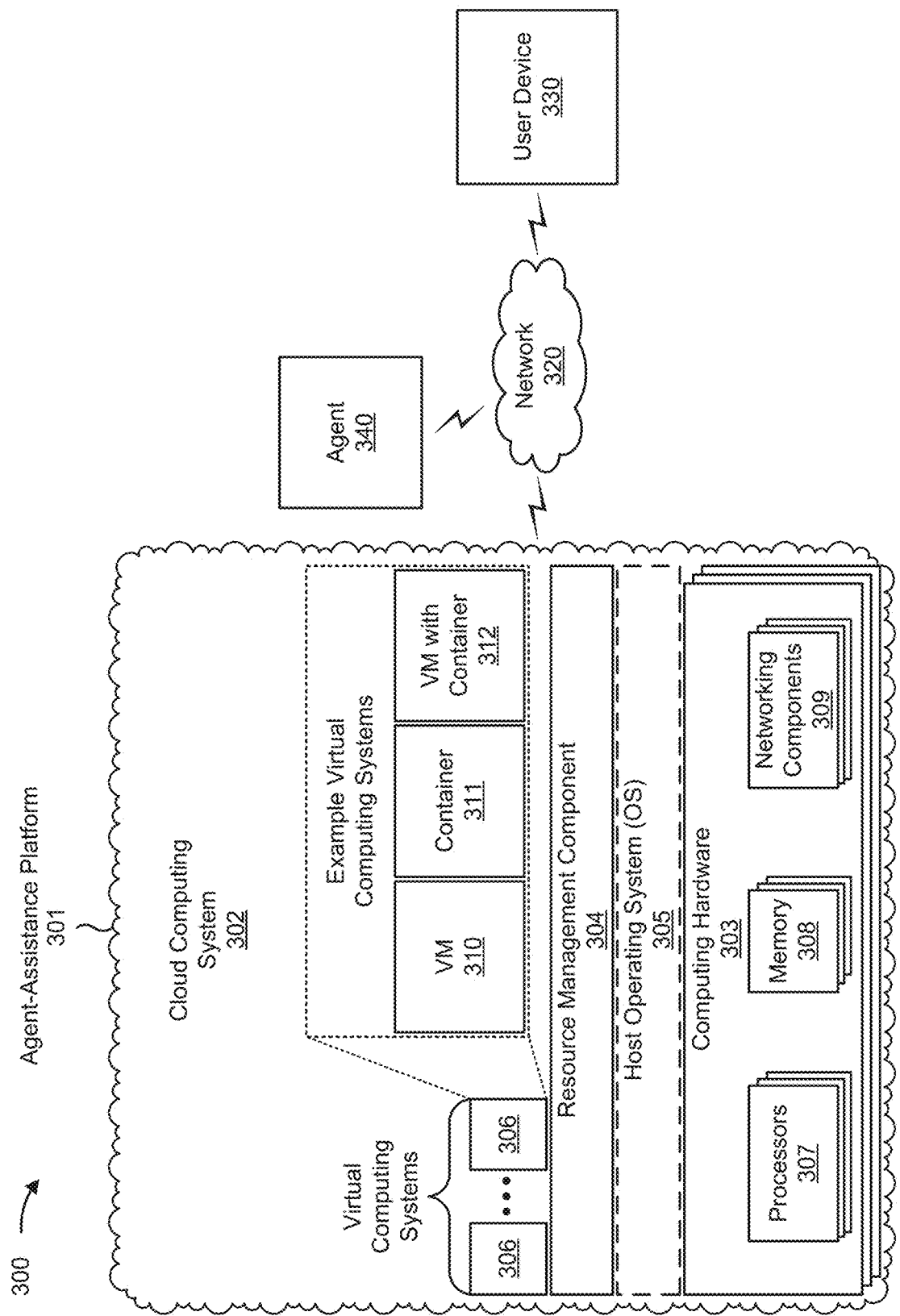
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an agent-assistance platform 301, which may include one or more elements of and/or may execute within a cloud computing system 302. The cloud computing system 302 may include one or more elements 303-312, as described in more detail below. As further shown in FIG. 3, environment 300 may include a network 320, a user device 330 or an agent device 340. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the agent-assistance platform 301 may include one or more elements 303-312 of the cloud computing system 302, may execute within the cloud computing system 302, and/or may be hosted within the cloud computing system 302, in some implementations, the agent-assistance platform 301 may not be cloud-based (e.g., may be implemented outside of a cloud computing system) or may be partially cloud-based. For example, the agent-assistance platform 301 may include one or more devices that are not part of the cloud computing system 302, such as device 300 of FIG. 3, which may include a standalone server or another type of computing device. The agent-assistance platform 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user device 330 may include one or more devices capable of receiving, generating, storing, processing, and/or providing information associated with a conversation, as described elsewhere herein. The user device 330 may correspond to the user device 110, described above. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The agent device 340 may include one or more devices capable of receiving, generating, storing, processing, and/or providing information associated with a conversation, as described elsewhere herein. The agent device 340 may correspond to the agent device 120 described above. The agent device 340 may include a communication device and/or a computing device. For example, the agent device 340 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
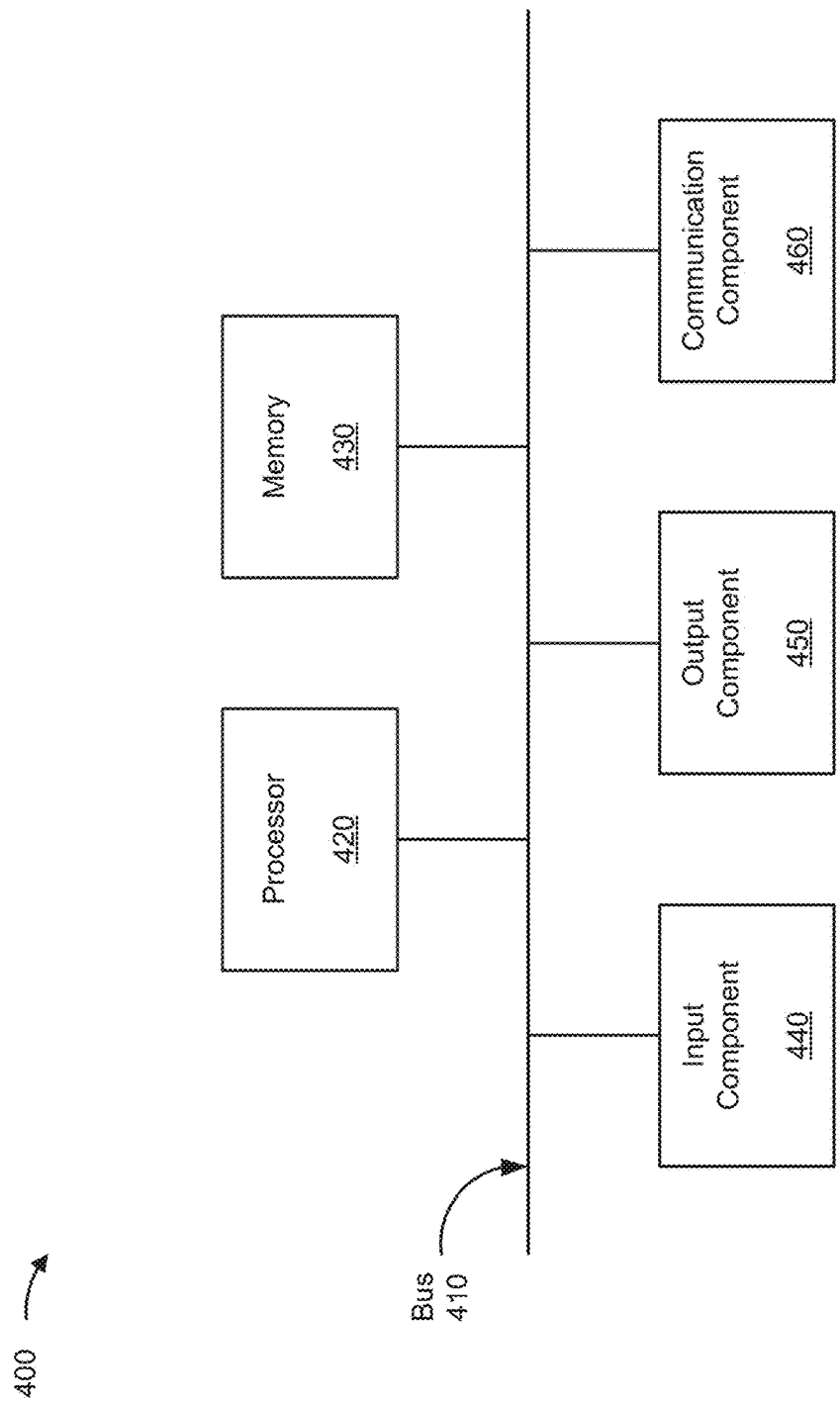
FIG. 4 is a diagram of example components of a device associated with adaptive computer-assistance prompts.

FIG. 4 is a diagram of example components of a device 400 associated with adaptive computer-assistance prompts. The device 400 may correspond to agent-assistance platform 301, user device 330, and/or agent device 340. In some implementations, agent-assistance platform 301, user device 330, and/or agent device 340 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
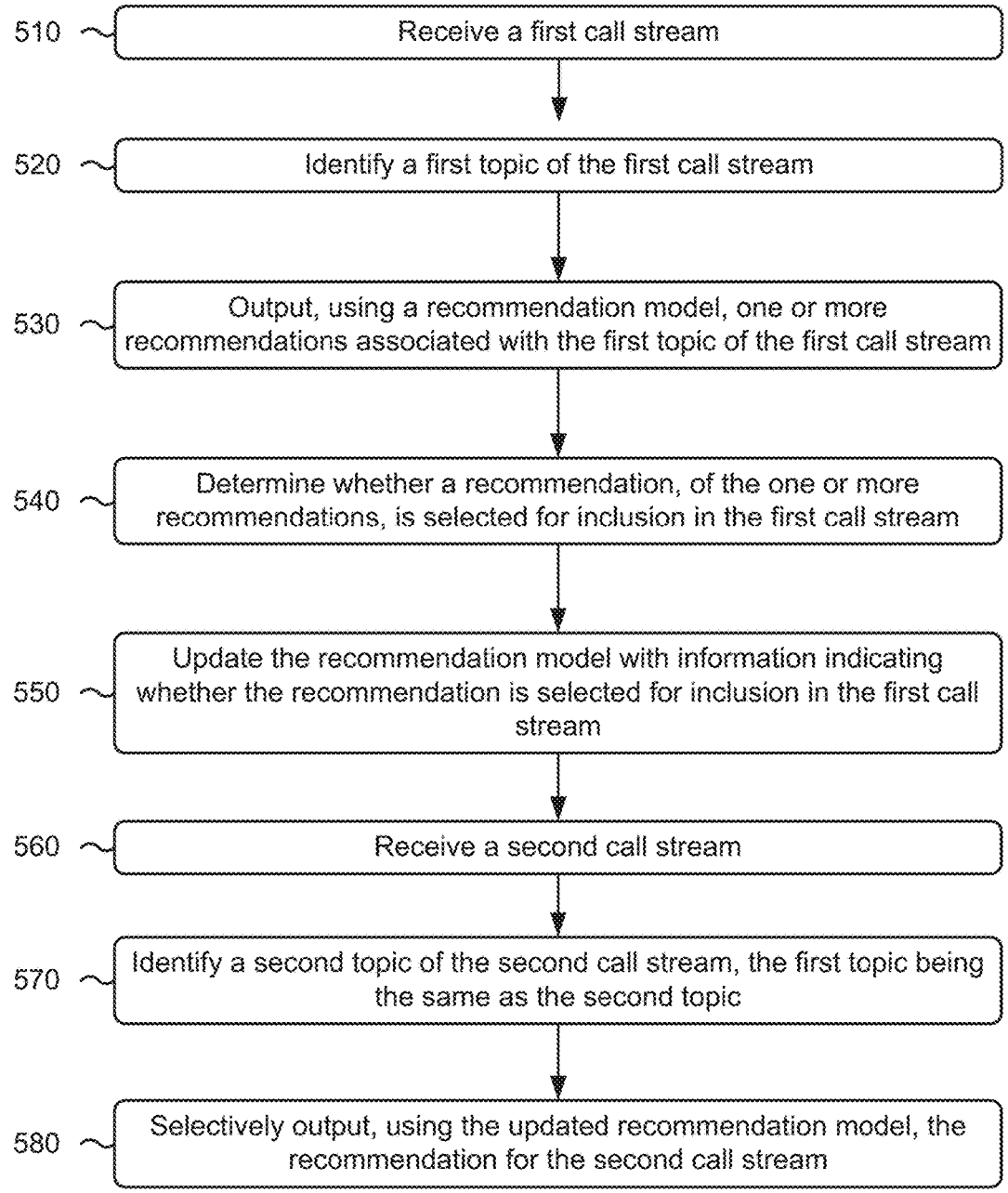
FIG. 5 is a flowchart of an example process associated with adaptive computer-assistance prompts.

FIG. 5 is a flowchart of an example process 500 associated with adaptive computer-assistance prompts. In some implementations, one or more process blocks of FIG. 5 may be performed by an agent-assistance platform (e.g., agent-assistance platform 130 or 301). In some implementations, one or more process blocks of FIG. 5 may be performed by another device or a group of devices separate from or including the agent-assistance platform, such as a user device (e.g., user device 110 or 330) and/or an agent device (e.g., agent device 120 or 340). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving a first call stream (block 510). For example, the agent-assistance platform may receive a first call stream, as described above.

In some implementations, process 500 includes processing audio of the first call stream to generate a text stream, and identifying the first topic comprises identifying the first topic based on the text stream. In some implementations, process 500 includes processing video of the first call stream to generate a text stream, and identifying the first topic comprises identifying the first topic based on the text stream.

As further shown in FIG. 5, process 500 may include identifying a first topic of the first call stream (block 520). For example, the agent-assistance platform may identify a first topic of the first call stream, as described above. In some implementations, each topic, of a set of topics including the first topic, is associated with a separate recommendation model of a set of recommendation models including the recommendation model.

As further shown in FIG. 5, process 500 may include outputting, using a recommendation model, one or more recommendations associated with the first topic of the first call stream (block 530). For example, the agent-assistance platform may output, using a recommendation model, one or more recommendations associated with the first topic of the first call stream, as described above. In some implementations, the recommendation model is associated with the first topic and at least one other topic of a set of topics. In some implementations, identifying the first topic comprises identifying the first topic based on natural language processing of a text stream.

As further shown in FIG. 5, process 500 may include determining whether a recommendation, of the one or more recommendations, is selected for inclusion in the first call stream (block 540). For example, the agent-assistance platform may determine whether a recommendation, of the one or more recommendations, is selected for inclusion in the first call stream, as described above. In some implementations, determining whether the recommendation is selected comprises determining that the recommendation is not selected for inclusion in the first call stream, and selectively outputting the recommendation comprises suppressing the recommendation.

As further shown in FIG. 5, process 500 may include updating the recommendation model with information indicating whether the recommendation is selected for inclusion in the first call stream (block 550). For example, the agent-assistance platform may update the recommendation model with information indicating whether the recommendation is selected for inclusion in the first call stream, as described above. In some implementations, the recommendation model is specific to a particular call agent. In some implementations, the recommendation model is common to a plurality of agents. In some implementations, the recommendation model is based on a static threshold. In some implementations, the recommendation model is associated with a machine learning prediction. In some implementations, process 500 includes receiving agent feedback regarding the one or more recommendations, and updating the recommendation model comprises updating the recommendation model based on the agent feedback. In some implementations, the recommendation model is trained to optimize clickthrough rate on provided recommendations.

As further shown in FIG. 5, process 500 may include receiving a second call stream (block 560). For example, the agent-assistance platform may receive a second call stream, as described above.

As further shown in FIG. 5, process 500 may include identifying a second topic of the second call stream, the first topic being the same as the second topic (block 570). For example, the agent-assistance platform may identify a second topic of the second call stream, the first topic being the same as the second topic, as described above.

As further shown in FIG. 5, process 500 may include selectively outputting, using the updated recommendation model, the recommendation for the second call stream (block 580). For example, the agent-assistance platform may selectively output, using the updated recommendation model, the recommendation for the second call stream, as described above.

In some implementations, process 500 includes determining, using the recommendation model, that recommendations have been skipped from inclusion in a set of call streams, and suppressing all recommendations for a configured period of time. In some implementations, process 500 includes determining that the configured period of time has elapsed, and returning to providing recommendations based on determining that the configured period of time has elapsed. In some implementations, process 500 includes determining a correlation between recommendation selection frequency and inclusion of recommendations in call streams, and selectively outputting the recommendation comprises selectively outputting the recommendation based on the correlation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by an agent-assistance platform, a first call stream;
   identifying, by the agent-assistance platform, a first topic of the first call stream;
   outputting, by the agent-assistance platform and using a recommendation model, one or more recommendations associated with the first topic of the first call stream;
   determining, by the agent-assistance platform, whether a recommendation, of the one or more recommendations, is selected by an agent for inclusion in the first call stream;
   updating, by the agent-assistance platform, the recommendation model with information indicating whether the recommendation is selected for inclusion in the first call stream;
   identifying, by the agent-assistance platform, a quantity of times the recommendation was selected for inclusion and clicked;
   receiving, by the agent-assistance platform, a second call stream;
   identifying, by the agent-assistance platform, a second topic of the second call stream, the first topic being a same as the second topic; and
   selectively outputting, by the agent-assistance platform, based on the quantity of times the recommendation was selected for inclusion and clicked, and using the updated recommendation model, the recommendation for the second call stream.

2. The method of claim 1, wherein determining whether the recommendation is selected comprises:
   determining that the recommendation is not selected for inclusion in the first call stream; and
   wherein selectively outputting the recommendation comprises:
   suppressing the recommendation.

3. The method of claim 1, further comprising:
   determining, using the recommendation model, that recommendations have been skipped from inclusion in a set of call streams; and
   suppressing all recommendations for a configured period of time.

4. The method of claim 3, further comprising:
   determining that the configured period of time has elapsed; and
   returning to providing recommendations based on determining that the configured period of time has elapsed.

5. The method of claim 1, further comprising:
   determining a correlation between recommendation selection frequency and inclusion of recommendations in call streams; and
   wherein selectively outputting the recommendation comprises:
   selectively outputting the recommendation based on the correlation.

6. The method of claim 1, wherein each topic, of a set of topics including the first topic, is associated with a separate recommendation model of a set of recommendation models including the recommendation model.

7. The method of claim 1, wherein the recommendation model is associated with the first topic and at least one other topic of a set of topics.

8. An agent-assistance platform, comprising:
   one or more processors configured to:
   receive a call stream;
   identify a topic of the call stream;
   identify a quantity of times a recommendation was selected for inclusion and clicked;
   determine, using a recommendation model, whether to provide one or more recommendations associated with the topic of the call stream, the recommendation model being based on a measured clickthrough rate for previous recommendations provided for the topic of the call stream,
wherein the measured clickthrough rate is determined based on the quantity of times a recommendation was selected; and
selectively output the one or more recommendations for the call stream based on determining whether to provide the one or more recommendations.

9. The agent-assistance platform of claim 8, wherein the one or more processors are further configured to:
processing audio of the call stream to generate a text stream; and
wherein the one or more processors, to identify the topic, are configured to:
identify the topic based on the text stream.

10. The agent-assistance platform of claim 8, wherein the one or more processors are further configured to:
processing video of the call stream to generate a text stream; and
wherein the one or more processors, to identify the topic, are configured to:
identify the topic based on the text stream.

11. The agent-assistance platform of claim 8, wherein the one or more processors, to identify the topic, are configured to:
identify the topic based on natural language processing of a text stream.

12. A non-transitory computer-readable medium storing a set of instructions, the set of instructions comprising:
one or more instructions that, when executed by one or more processors of an agent-assistance platform, cause the agent-assistance platform to:
receive data regarding a set of call streams having a common topic associated with a common set of recommendations;
identify a quantity of times a recommendation of the common set of recommendations was selected for inclusion and clicked;
determining a clickthrough rate on the common set of recommendations based on identifying the quantity of times;
receive a new call stream associated with the common topic;
determine, using a recommendation model, whether to output the common set of recommendations based on the clickthrough rate on the common set of recommendations; and
selectively output the common set of recommendations based on determining whether to output the common set of recommendations.

13. The non-transitory computer-readable medium of claim 12, wherein the one or more instructions further cause the agent-assistance platform to:
determine that the set of recommendations is not selected for inclusion in the new call stream; and
suppress the recommendation for a subsequent call stream.

14. The non-transitory computer-readable medium of claim 12, wherein the one or more instructions further cause the agent-assistance platform to:
determine, based on the clickthrough rate, that recommendations have been skipped from inclusion in a set of call streams; and
suppress all recommendations for a configured period of time.

15. The non-transitory computer-readable medium of claim 12, wherein the recommendation model is specific to a particular call agent.

16. The non-transitory computer-readable medium of claim 12, wherein the recommendation model is common to a plurality of agents.

17. The non-transitory computer-readable medium of claim 12, wherein the recommendation model is based on a static threshold.

18. The non-transitory computer-readable medium of claim 12, wherein the recommendation model is associated with a machine learning prediction.

19. The non-transitory computer-readable medium of claim 12, wherein the one or more instructions further cause the agent-assistance platform to:
receive agent feedback regarding the set of recommendations; and
wherein the one or more instructions, that cause the agent-assistance platform to update the recommendation model, cause the agent-assistance platform to:
update the recommendation model based on the agent feedback.

20. The non-transitory computer-readable medium of claim 12, wherein the recommendation model is trained to optimize clickthrough rate on provided recommendations.

* * * * *